UNITED STATES PATENT OFFICE.

WILLIAM WESLEY COE, JR., OF BLOOMSBURY, LONDON, ENGLAND.

DYE.

1,243,042.  Specification of Letters Patent.  Patented Oct. 16, 1917.

No Drawing.  Application filed August 23, 1916. Serial No. 116,492.

*To all whom it may concern:*

Be it known that I, WILLIAM WESLEY COE, Jr., a citizen of the United States of America, residing at 11 Ridgmount Gardens, Bloomsbury, in the county of London, England, have invented certain new and useful Improvements in Dyes, of which the following is a specification.

This invention relates to the production of dyes or stains and its chief object is to utilize for the preparation of such coloring substances, vegetable material of an inexpensive nature and partly or wholly a waste product obtainable in very large quantities.

According to this invention the dye is prepared by the action of a suitable chemical reagent or reagents upon a fruit of the banana class (banana or plantain), the pulp, skin or stalk or a mixture thereof being employed as the basis of the dye or stain. I have discovered that a great variety of fast colors both soft and brilliant in nature can be obtained by a very simple chemical treatment of the various portions of the banana, more especially by the action of strong alkalis and acids, aided in some cases by the addition of metallic compounds and the use of mordants. I will describe the general treatment found appropriate for the production of coloring material of high dyeing power and also various modifications in the treatment of the basic substance which produces a series of colors of greatly differing character.

The banana material, preferably after grinding or dividing into small particles, is treated with a solution of alkali hydroxid (sodium or potassium hydroxid) of, say, 20 per cent. strength, and after standing for some time the ingredients are heated to about the boiling point. The highly alkaline solution is then neutralized by acid, for example nitric, hydrochloric or sulfuric acid, in which a quantity of the basic banana material may also have been boiled. Both alkali and acid are hydrolyzing agents. After standing for, say, 24 hours, the solution, which is intensely colored, is filtered or strained from the pulp and may be used directly as a dye solution or may be evaporated down to obtain the dye in more concentrated form. It is usually desirable in dyeing leather or fabrics and more especially cotton goods, to treat the material first with tannic acid, or alum or some mordant of a kind commonly used in dyeing processes, the treatment by such substances considerably modifying the shade of the color obtained. Large differences in color are also found to depend upon whether the banana pulp alone is employed or the skin, or a mixture of skin and pulp or skin or pulp and stalk or all these parts of the basic material. Moreover the stage of ripeness of the fruit is found to alter the color to a marked extent, the ripe fruit giving quite a different shade to that given by the green fruit, so that by suitable mixtures an indefinite variation of shade is obtainable. The chemical nature of the various coloring matters obtained is not at present known but the following varieties of treatment are found to give the colors mentioned:

A soft or old rose color is obtained by treating green pulp and stalk in two solutions, one of potassium hydroxid and the other of nitric acid, about equal quantities of solution and banana substance being employed, with a strength of solution obtained by dissolving solid potassium hydroxid and strong commercial nitric acid respectively in about five times their weight of water. After boiling and leaving the two mixtures for some time one of them is added to the other until neutralization is effected. The neutral solution is then boiled and on dipping a fabric treated with alum as a mordant in the hot solution the fabric is dyed a rich old rose color. Dipping when cold gives a somewhat different rose color.

On varying the above process by adding nickel powder to green pulp and skin in the potash solution and using hydrochloric instead of nitric acid a gray color is obtained with fabric treated with tannic acid.

Various shades of yellow, from a deep orange yellow to pale lemon yellow are obtainable in many ways. For example a mixture of ripe pulp and green pulp with potassium hydroxid and hydrochloric acid solutions gives, on boiling and mixing the two solutions to neutralize, a succession of yellows to an untreated fabric, passing from darker to lighter yellow as the liquid cools. In most cases it is found that the lighter shade is obtained on cooling. Other shades of yellow are obtainable by the aid of nickel powder or iron and the following examples may be given, it being understood that the general process already described is followed in each case, the ingredients being varied as hereinafter mentioned. With green skin and stalk and nickel oxid in potassium hydroxid and nitric acid solutions dark and light yellows of different shades are given, respectively by hot and cold solutions, to fabric treated with tannic acid or with alum. A light yellow is produced on fabric treated with tannic acid by green skin in potassium hydroxid and green skin in a solution of sulfuric acid and alum. Dark yellow is produced on alum treated fabric from green pulp, ripe skin and stalk treated with sodium carbonate before the addition of sulfuric acid along with iron (iron filings may be used) and alum, potassium hydroxid being used to neutralize. A light yellow is given by a similar process with the omission of iron.

For the production of brown colors of various shades a considerable variety of treatment is also available and the following variations in ingredients have been actually tested: Ripe pulp in potassium hydroxid and in hydrochloric acid with alum treated fabric produces a dark brown while the solution is hot and a light brown on cooling. Green skin and ripe skin with addition of copper powder in potassium hydroxid and the same ingredients in nitric acid give darker shades when hot and lighter on cooling. Green pulp and ripe skin in potassium hydroxid and in sulfuric acid give shades of brown with alum treated fabric. In all cases the acid and alkaline solutions are mixed to neutralize each other as described in the general statement of the process.

Tan shades are given by the following mixtures: (1) Green pulp, green skin and ripe skin with nickel oxid in potassium hydroxid and hydrochloric acid. The fabric was treated with common soap before dyeing. (2) Green pulp and copper sulfate in potassium hydroxid and in nitric acid with alum treated fabric. This solution when quite cold gave a salmon pink color.

Greens of a variety of shades were obtained from the following mixtures: (1) Ripe pulp, ripe skin in potassium hydroxid and in nitric acid. (2) Ripe pulp, stalk and skin with iron, in potassium hydroxid and nitric acid, with alum treated fabric.

Violet color is obtained from ripe pulp and green skin in potassium hydroxid and in sulfuric acid, with alum treated fabric.

Dark and light lavender shade blues are obtained on an alum treated fabric from green pulp and green skin in potassium hydroxid and in sulfuric acid.

It will be seen from the above examples that the condition of the fruit, whether ripe or green, and the portions of the fruit employed exercise a great effect upon the color obtained, while other changes are effected by the addition, during the treatment of the basic material, of a metal, usually in the form of a salt or an oxid but sometimes in metallic state if readily attacked and dissolved by the chemical reagents. Iron, copper, cobalt, manganese (for example, the dioxid or potassium permanganate), chromium (for example the oxid or potassium bichromate), nickel, and other metals or their compounds may be employed in any of the preparations of the coloring solution in accordance with the foregoing description. The above metals belong to the heavier groups and give colored salts, and such are generally suitable for the present purpose.

What I claim and desire to secure by Letters Patent of the United States is:—

1. A dye comprising extracted coloring material of plant substance of the banana class.

2. A dye comprising extracted coloring material of plant substance of the banana class, in solution.

WILLIAM WESLEY COE, Jr.